(12) United States Patent
Lawler, Jr. et al.

(10) Patent No.: US 6,196,912 B1
(45) Date of Patent: Mar. 6, 2001

(54) MACHINE READABLE TAG

(75) Inventors: Casimir E. Lawler, Jr., Deephaven; Richard I. Parry, Edina, both of MN (US)

(73) Assignee: Meat Processing Service Corporation, St. Paul, MN (US)

( * ) Notice: Subject to any disclaimer, the term of this patent is extended or adjusted under 35 U.S.C. 154(b) by 0 days.

(21) Appl. No.: 09/506,963

(22) Filed: Feb. 18, 2000

Related U.S. Application Data

(60) Continuation-in-part of application No. 09/365,483, filed on Aug. 2, 1999, now abandoned, which is a division of application No. 09/081,358, filed on May 19, 1998, now Pat. No. 5,964,656.

(51) Int. Cl.$^7$ ....................................................... A22B 5/00
(52) U.S. Cl. ............................................. 452/173; 452/76
(58) Field of Search ................................. 452/173, 76, 77

(56) References Cited

U.S. PATENT DOCUMENTS

| | | | |
|---|---|---|---|
| 3,178,763 | * 4/1965 | Kolman | 452/173 |
| 4,279,059 | * 7/1981 | Anderson et al. | 452/173 |
| 4,337,549 | * 7/1982 | Anderson et al. | 452/173 |
| 4,468,839 | * 9/1984 | Chittenpen | 452/173 |
| 4,774,741 | 10/1988 | Bernhardt et al. | |
| 4,946,692 | 8/1990 | Bernhardt et al. | |
| 5,007,336 | 4/1991 | Bernhadt et al. | |
| 5,178,579 | * 1/1993 | Simmons | 452/173 |
| 5,312,293 | * 5/1994 | Rankin et al. | 452/173 |
| 5,326,308 | * 7/1994 | Norrie | 452/17 |
| 5,484,332 | * 1/1996 | Leech et al. | 452/173 |
| 5,500,650 | * 3/1996 | Snodgrass et al. | 142/42 |
| 5,551,374 | * 9/1996 | Wells | 452/173 |
| 5,616,073 | * 4/1997 | Curry et al. | 452/173 |
| 5,779,839 | * 7/1998 | Tuttle et al. | 156/213 |
| 5,822,714 | * 10/1998 | Cato | 702/108 |
| 5,874,724 | * 2/1999 | Cato | 235/492 |
| 5,938,519 | * 8/1999 | Wright | 452/173 |
| 5,980,375 | * 11/1999 | Anderson et al. | 452/173 |

FOREIGN PATENT DOCUMENTS

2000013 * 1/1979 (GB) .................................... 452/173

* cited by examiner

*Primary Examiner*—Willis Little
(74) *Attorney, Agent, or Firm*—Vidas, Arrett & Steinkraus, P.A.

(57) ABSTRACT

In the inventive method for the sanitary rinsing of an animal, an assembly line is provided which includes a plurality of shackles. Each shackle includes an inventive tag which includes a machine readable unique shackle number. Once an animal is stunned and attached to a shackle the animal is moved to a weighing station, which is equipped with a tag reader, weighs the animal and transmits the weight and shackle number to a computer where the data is recorded in a database. The animal is then bled and moved to a rinsing station, which is equipped with a tag reader which reads the shackle number. The system then looks up the weight of the animal to be rinsed at that particular rinsing station and calculates the amount of solution to inject into the circulatory system of the animal. After the end of the hose and nozzle and the operator's hands are sanitized, which is verified by the system, the nozzle is inserted into an entry point into the circulatory system and the operator starts the flow of the predetermined amount of solution into the animal. If the flow is not started within a time window, the operator must re-sanitize.

13 Claims, 8 Drawing Sheets

MACHINE READABLE TAG

CROSS REFERENCE TO RELATED APPLICATIONS

This application is a continuation-in-part of application Ser. No. 09/365,483 which was filed Aug. 2, 1999 now abandoned, which is a divisional of the application 09/081,358 filed May 19, 1998 which matured as U.S. Pat. No. 5,964,656 which issued Oct. 12, 1999, the entire contents of which are hereby incorporated by reference.

BACKGROUND OF THE INVENTION

1. Field of the Invention

This invention relates to a protectively encapsulated radio frequency identification device (RFID) and method of use. The invention further relates to an improved method for the sanitary processing of animals that utilizes the novel RFID. By incorporating the inventive RFID in the unique processing method disclosed herein, greater levels of safety and sanitation will be available while at the same time improving the palatability and consistency of the meat product.

2. Description of the Related Art

There exists a need in the meat packing industry for a method of tracking and identifying the various steps and procedures involved in preparing and processing an animal for human consumption. This need has arisen as a result of consumers and advocate groups'demands for cleaner facilities and safer meat handling methods. As a result many proponents have advocated for increased product sanitation by forcing processing plants to ensure that during each stage of the processing procedure the sanitary quality of the product remains uncompromised.

In an attempt to address this highly significant concern many meat processors have instituted tracking systems within their processing plants. These systems are intended to give the plant operators the ability to control all procedures which each animal is subjected to on an individual basis. Such specific tasking control will allow the operator the ability to ensure that each and every animal that enters the processing line is subjected to every sterilization and sanitation procedure without variance.

While these tracking systems are an essential addition to the meat processing industry, those systems which have been implemented have failed in a number of regards. Foremost of the problems that the various manufacturers of tracking systems have failed to take into account, is the extremely hostile environment of a meat processing plant.

It is apparent that the need remains within the meat packing industry for a an improved, low cost, simple maintenance, and unobtrusive tracking system that is capable of operating within the hostile environment of a meat processing plant. To meet this continued tracking system need the presently disclosed invention proposes utilizing the disclosed RFID and associated novel processing method as an ideal solution.

SUMMARY OF THE INVENTION

The inventive system disclosed herein addresses the aforementioned problems in addition to many others. By employing a novel encapsulated radio frequency identification device into an improved animal processing system a resulting method for processing animals is created that increases safety and sanitation levels.

Radio frequency identification tags are known to be used in the food processing and other industries. The PROTECH Labeling Systems, PROTag™ Electronic Trolley Identification System is an example of using a radio identification tag to track shackles through a food smokehouse. The PROTag™ system differs from the proposed system in that the PROTag™ system encloses a radio frequency identification tag into an elastomeric form which screws into a stainless steel or plastic mounting ring. Such mounting does offer some degree of physical protection to the tag from the outside environment, but the mounting ring may be damaged or break off making repair or replacement difficult.

The proposed RFID overcomes this prior application by completely enclosing the radio tag within a novel molded protective resin form. The resulting encapsulated RFID disclosed herein offers a greater amount of physical protection for the tag itself, and also prolongs the useful life of the tag. The proposed system is also easier to install, and maintain than present art. When employed as the tracking component of the system described, the RFID will allow the user to track every operation of the system which will help to insure uniform application of all sanitary procedures.

In addition to improving the degree of sanitation in the meat packing industry, the present invention addresses a second need as well. Recent surveys and studies by the National Cattleman's Beef Association (NCBA) and others have found that possibly as much as a third of the potential consumer market has stopped eating many meat products, especially beef, due to a perceived lack of palatability. As a result of such findings it is apparent that a need exists to develop a means of increasing beef palatability in order to regain this lost market share. Consequently, in addition to improving sanitary practices within processing plants, the novel processing method disclosed herein utilizes a system of sterilizing rinses and cooling injections to lower the pH levels within the animal carcass. This injection procedure has the benefit of giving the meat a more appealing and uniform color, texture, tenderness and taste. Furthermore, the disclosed treatment also increases shelf-life and retards premature spoilage.

The combination of benefits described above and further described herein, are the consequence of utilizing, in combination, the novel encapsulated radio frequency identification tag and the further novel use of the Meat Processing Service Corporation (MPSC) Rinse & Chill Technique (R&CT). The R&CT process uses a pH lowering and temperature reducing solution to rinse out residual blood through the R&CT process, bringing about a natural change in pH which bestows many benefits. There are also other benefits that are not related to pH reduction that the R&CT provides, such as easier removal of the hide. The encapsulated radio frequency identification tag and R&CT system combine to form a processing system with greatly improved sanitary and safety features while at the same time dramatically increasing the value of the end meat product.

In the inventive method for the sanitary rinsing of an animal, an assembly line is provided which includes a plurality of shackles. Each shackle includes an inventive RFID tag which includes a machine readable unique shackle number. Once an animal is stunned and attached to a shackle the animal is moved to a weighing station, which is equipped with an RFID tag reader, weighs the animal and transmits the weight and shackle number to a computer where the data is recorded in a database. The animal is then bled and moved to a rinsing station, which is equipped with an RFID tag reader which reads the shackle number. The system then looks up the weight of the animal to be rinsed at that particular rinsing station and calculates the amount of solution to inject into the circulatory system of the animal. After the end of the hose and nozzle and the operator's hands are sanitized, which is verified by the system, the nozzle is inserted into an entry point into the circulatory system and the operator starts the flow of the predetermined amount of solution into the animal. If the flow is not started within a time window, the operator must re-sanitize.

The inventive RFID tag is made by pouring curable liquid into a preformed mold to a first predetermined depth. A predetermined time is allowed to pass to permit the curable liquid to gel, but not sufficient to allow the liquid to fully cure. The circuitry is then placed upon the surface of the now gelled liquid and the mold is filled to a second predetermined depth with additional curable liquid. A second predetermined amount of time is allowed to pass to allow both the first and second depths of the poured curable liquid to fully cure and attain a homogeneous interface between the two depths, thereby preventing the occurrence of a seam between the two depths of now cured liquid.

This method produces an encapsulated RFID which keeps all metal objects at least ¼, but preferably ½ inch away so that the metal objects do not interfere with the radio frequency communication. The encapsulating material is a polyurea elastomer compound.

An alternative embodiment of the system and method utilizes a tag with the schackle number encoded and a reader which can read the tag. The number can be encoded using any existing encoding technique which is machine readable.

BRIEF DESCRIPTION OF THE DRAWINGS

A detailed description of the invention is hereafter described with specific reference being made to the drawings in which.

DESCRIPTION OF THE PREFERRED EMBODIMENTS

The following detailed description and the accompanying drawings are provided for purposes of describing and illustrating presently preferred embodiments or examples of specific embodiments of the of the invention only. This description and accompanying drawings are not intended to limit the scope of the invention in any way.

Figure 1:
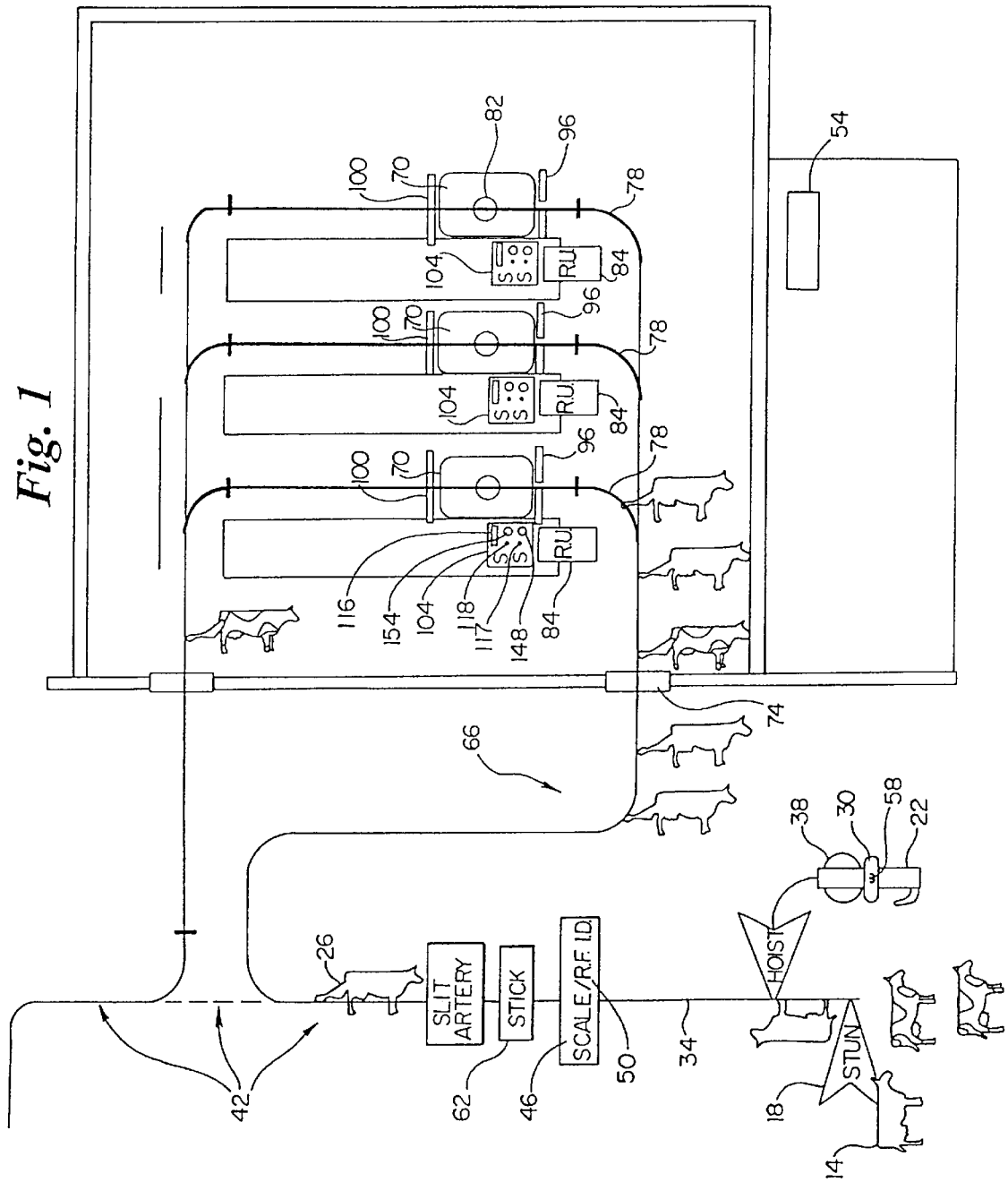
FIG. 1 is an overhead schematic of a preferred embodiment of the inventive processing method.
Figure 2:
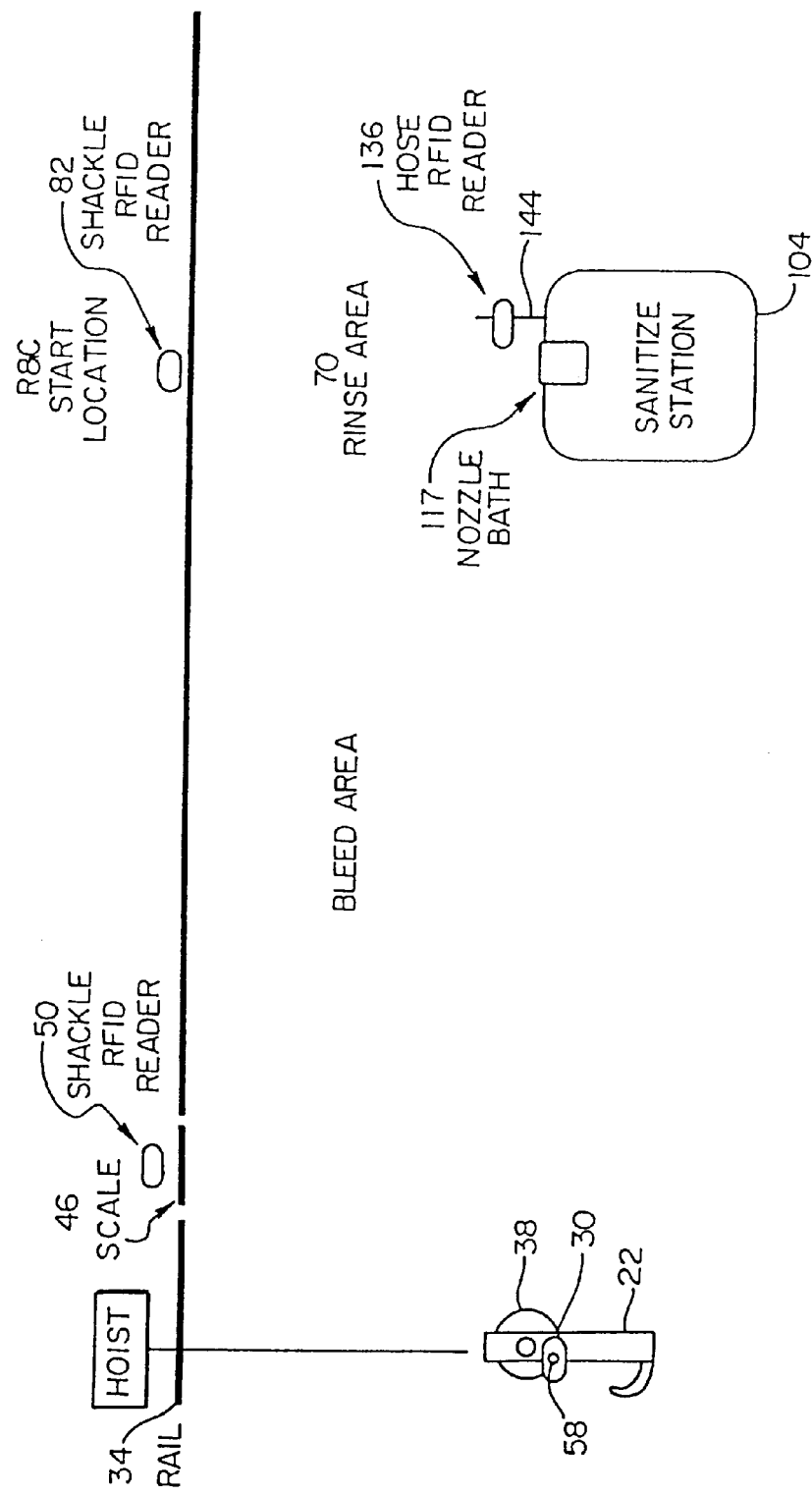
FIG. 2 is a second schematic representation of the preferred embodiment of the inventive processing apparatus.
Figure 3:
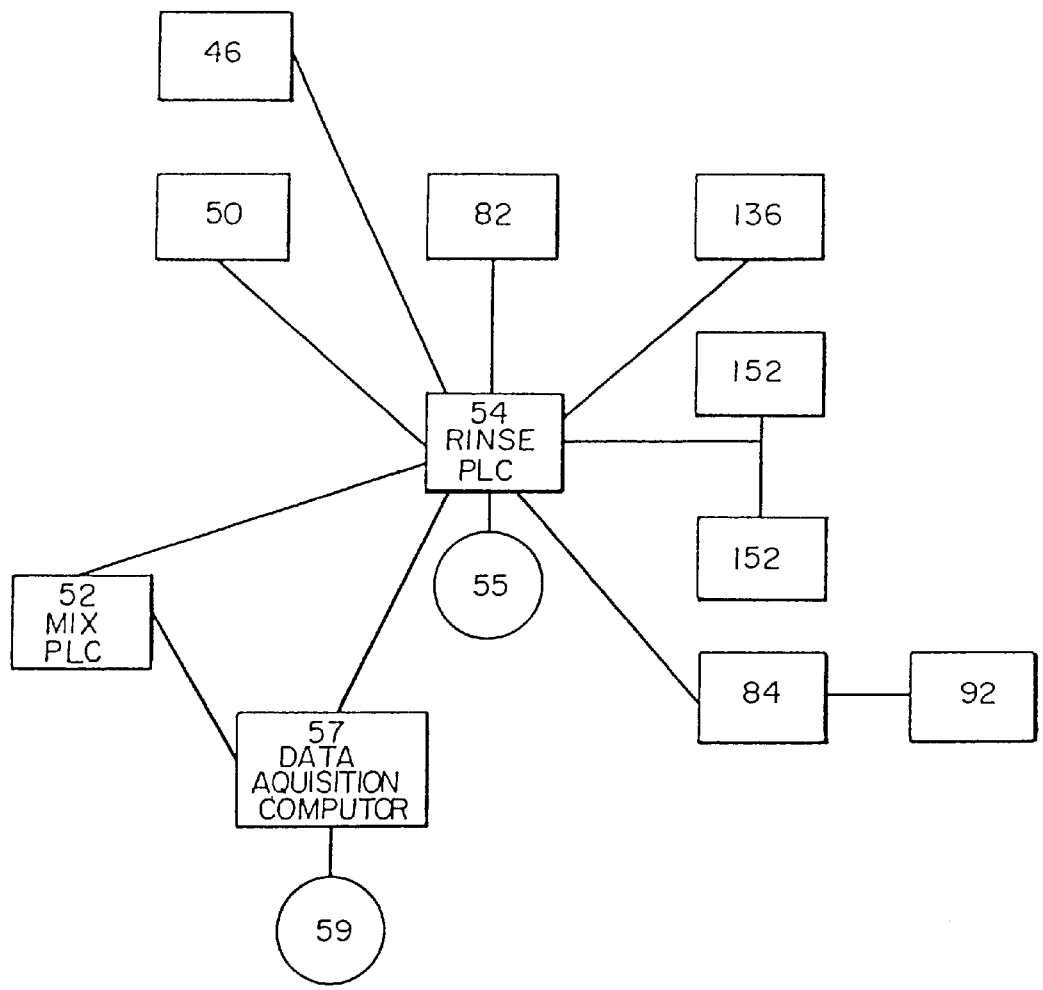
FIG. 3 is a generalized block diagram illustrating the relative position and communicative interaction of the RFID reader system components.

Referring to FIG. 1–3 of the accompanying drawings the animal processing system 10 is shown in a preferred assembly line format. FIG. 1 illustrates the various steps involved at each point of the animal processing system 10, and further illustrates where various components of the system are placed in relation to one another. FIG. 2 better illustrates the various components of the inventive process. FIG. 3 illustrates the communicative relationship between various electronic components of the animal processing system 10. While the present embodiment demonstrates the system as used with cows 14, the system also works for other animals such as cattle, sheep, or turkeys, in alternate embodiments.

This preferred embodiment is controlled by electronic processing units, such as computers. The computer used in this preferred embodiment is a programmable logic controller (PLC). The PLC is a minimally configured computer that is generally operated without a monitor, keyboard, floppy drive, hard drive, or mouse. Programming and service of a PLC generally takes place over a serial connection, such as RS232, to a separate program development computer, which is generally either a desktop or portable personal computer. The computer 54 incorporated within the preferred embodiment is intended to be an Allen-Bradley SLC500 Programmable Logic Controller.

A database is used to track information relating to the rinsing and chilling process. The database 55 may be stored entirely or partially on computer 54. This preferred embodiment stores only the RFID tag numbers and associated weights in database 55 on computer 54. When a rinse is initiated, this information, plus a time stamp and other process information is transferred to a second database 59 on a data acquisition computer 57. This transfer takes place over a serial communications link network between the computers. Database 59 may also store information from other components of the system, such as the mix station computer 52. The mix station computer 52 also provides information directly to the rinse station computer 54. This information from the mix station is used for system interlocks of the rinse station, allowing the rinse process to start only after the entire system has gone through a clean-in-place (CIP) and sanitize process, and viable rinsing solution is circulating throughout the system.

The process of stunning an animal for slaughter is well known within the art. This stunning results in the animal becoming irreversibly unconscious. In this embodiment, the cow 14 is stunned in stunning area 18. Upon being stunned the cow 14 is attached to a wheeled shackle 22 by one of the rear legs 26 of the cow 14. As indicated by the wheeled shackle 22 detail in FIG. 1, bolted to the wheeled shackle 22 is an encapsulated RFID 30, which encapsulates an electronic tag 58. The wheeled shackle 22 is then mounted to the overhead rail 34 to suspend the cow 14 from the overhead rail 34 in an inverted position. The overhead rail 34 is constructed in a manner to allow the wheel 38 of the wheeled shackle 22 to have essentially unrestricted bidirectional motion while mounted to the overhead rail 34, and this method of rail-shackle mounting is well known in the art.

An additional feature of the preferred embodiment, the animal processing system 10 can be a modification or addition to an existing processing system by redirecting and adding to existing overhead rail 42.

Once appropriately suspended the cow 14 is moved along the overhead rail 34 to a weight scale 46 and associated first RFID reader 50. At the weight scale the cow 14 is weighed. Once a stable weight reading is attained, the weight scale 46 sends the weight information to a computer 54, and stores this information in a database 55 on computer 54. The database takes the form of records in a table for storing the shackle number, the weight of the animal and optionally the time and date, as well as a processed indicator. Subsequently, the first RFID reader 50 accesses the information stored in the memory of the electronic radio tag 58 and likewise sends this information to the computer 54. As rinses are started for the animals, the information associated with that animal and shackle is moved to another computer 57 and database 59, thereby clearing the original database. If an animal is not rinsed and the RFID information is not moved, upon sensing the tag at RFID reader 50 again, the earlier entry of that RFID information is cleared and replaced with the new information. In the preferred embodiment, off-the-shelf wireless transmitters and receivers are used to communicate this information from the RFID tag readers to the computer 54. In an alternate embodiment, these RFID tags themselves may have weight information written directly to them and stored for retrieval at the time of rinsing. Upon obtaining the respective information from the weight scale 46 and the first RFID reader 50, the computer 54 will associate the individual number of each tag 58 and the corresponding weight of each cow 14 in the database. It should be understood, as is well known in the art, the components of the animal processing system 10 may be connected conductively, optically, or wirelessly. For example, the RFID tag readers may communicate wirelessly with the computer by transmitting the information with a transmitter and receiving the information at the computer with a receiver, as is well known in the art.

The aforementioned electronic components of the preferred embodiment disclosed above use the Escort Memory System (EMS), a DATALogic Group Company, line of radio frequency identification tags which are capable of storing a multiple-digit number within the electronic memory of the tag 58, specifically for the purpose of identifying the tag 58 during use. The presently preferred embodiment uses the EMS EH620HT RFID tag and the EMS RS400 RFID reader with the EMS AS15 antenna. Other RFID tags and readers by EMS and other manufacturers may also be used in this system. Similarly, the Escort Memory System tag reader is the model of tag reader utilized by the disclosed preferred embodiment in the form of the RFID readers. The Escort Memory System's tag reader is designed to sense and read a radio tag 58 signal when the distance between the tag and the tag reader is typically less than 3.4 inches. Throughout the inventive system disclosed herein it should be understood that the respective tag readers are positioned in such manner as to ensure an acceptable communicative distance from the relevant encapsulated radio frequency identification devices.

After the weight has been obtained and transmitted to computer 54, the cow 14 moves off of the weight scale 46 to a bleeding station 62 where the cow 14 is bled. The process of sticking and bleeding the animal is a procedure well known and described within the art. For this preferred embodiment, the cow 14 is to be bled through the jugular veins and the carotid artery. The cow 14 is then moved along the overhead rail 34 over a blood pit 66 toward the rinse start area 70.

Prior to entering the rinse start area 70 the cow 14 must pass through a first separation door 74. In alternate embodiments, these separation doors 74 are not used. Upon passing through the first separation door 74, the overhead rail 34 separates into multiple gravity-rails 78. In the embodiment illustrated herein, the animal processing system 10 utilizes three gravity-rails 78, however this embodiment is not intended to limit the number or type of rail 78 or manner of motivation which could otherwise be employed. The gravity-rails 78 guide the cow 14 from the overhead rail 34 to the rinse start area 70. In alternate embodiments, the rails used to convey the cow 14 may have moving members, such as chains, so as not to rely on gravity for motivation.

After the cow 14 has moved onto the divided rail 78, it passes through a first transparent door 96, thereby entering the rinse start area 70. In the preferred embodiment the first transparent door 96 and the second transparent door 100 are Jamison Auto-Clear transparent doors. These are automatically opened by a control switch activated by the operator. In alternate embodiments, these doors may be manually operated, or controlled by a switch on the rail activated by the presence of a shackle.

At the start of each rinse start area 70 a second RFID reader 82 is positioned. As the cow 14 passes the second RFID reader 82 the RFID 30 is again read. Upon sensing the tag 58, the second RFID reader 82 sends the individual tag 58 identification number to the computer 54.

Adjacent to the rinse start area 70 is a rinsing station 84. The rinsing station 84 includes a hose 88 and an attached nozzle assembly 92 with a further attached encapsulation bracelet embodiment of the RFID 108, all of which are illustrated with greater detail in FIGS. 5–8. In the preferred embodiment the nozzle assembly 92 further has an attached secured sanitary catheter 112 as disclosed in pending U.S. patent application for Secured Sanitary Catheter, Ser. No.: 08/870,195, filed Jun. 6, 1997 to Meat Processing Services Corp., Inc., the entire contents of which are hereby incorporated by reference.

Figure 4:
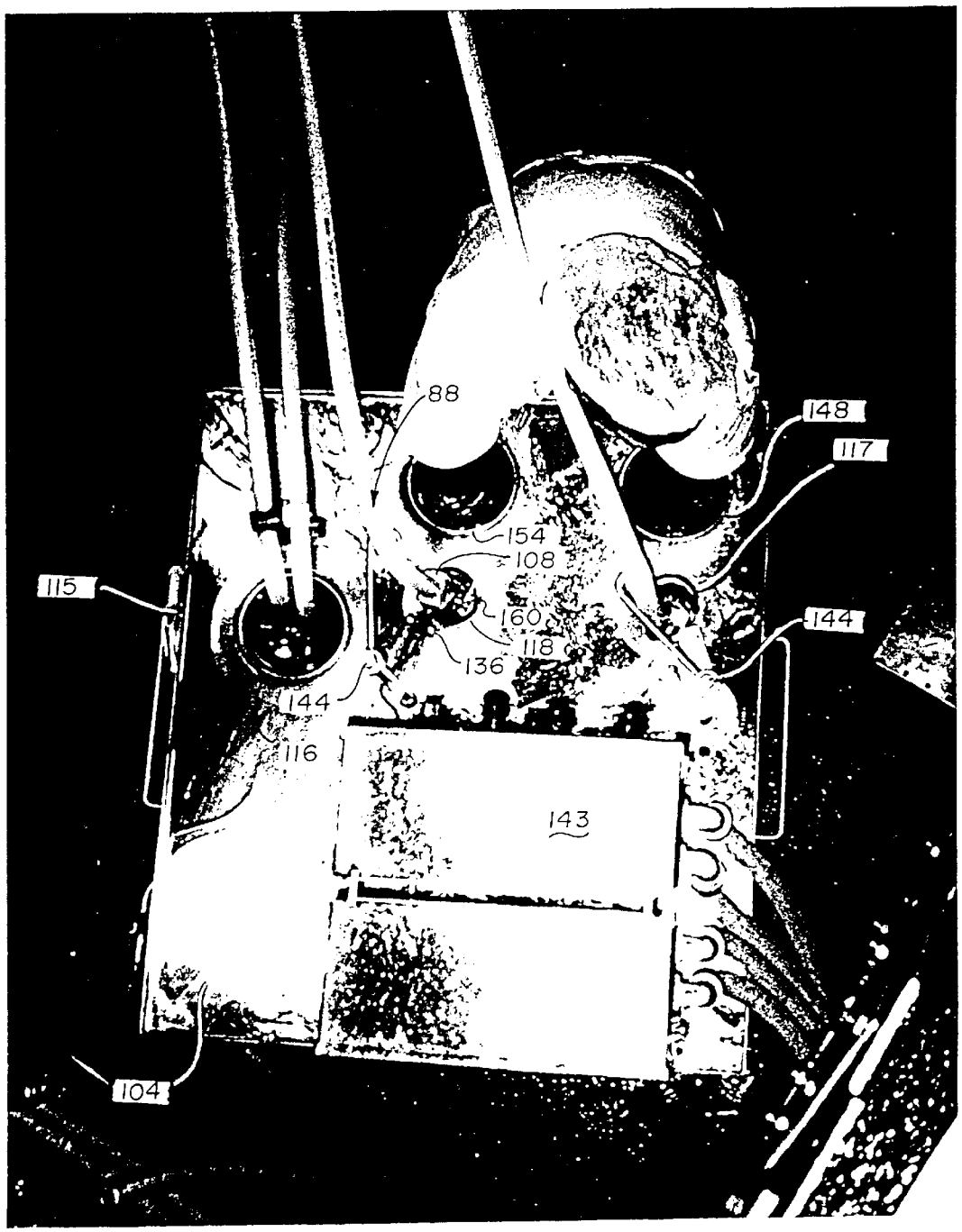
FIG. 4 is a top view of the sanitization station.
Figure 10:
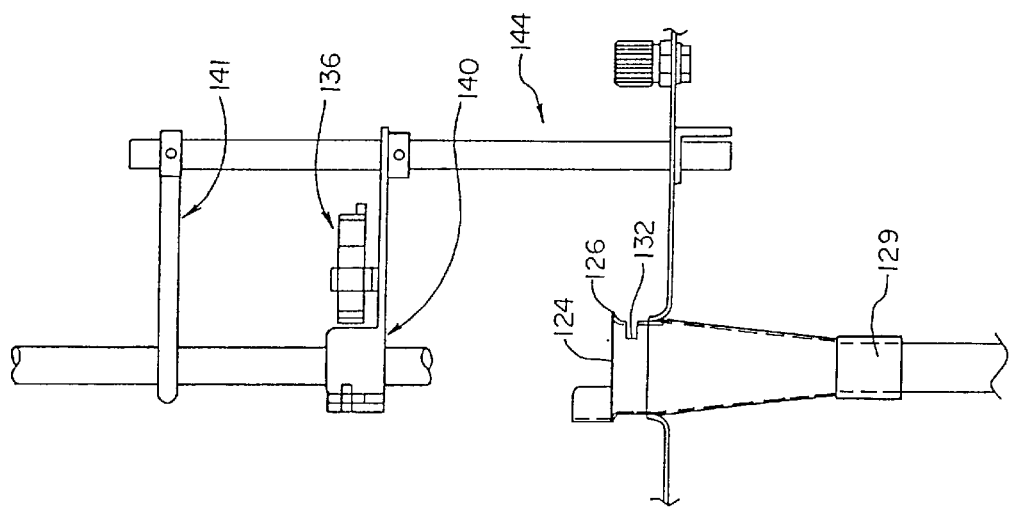
FIG. 10 shows a side view of the nozzle bath.
Figure 11:
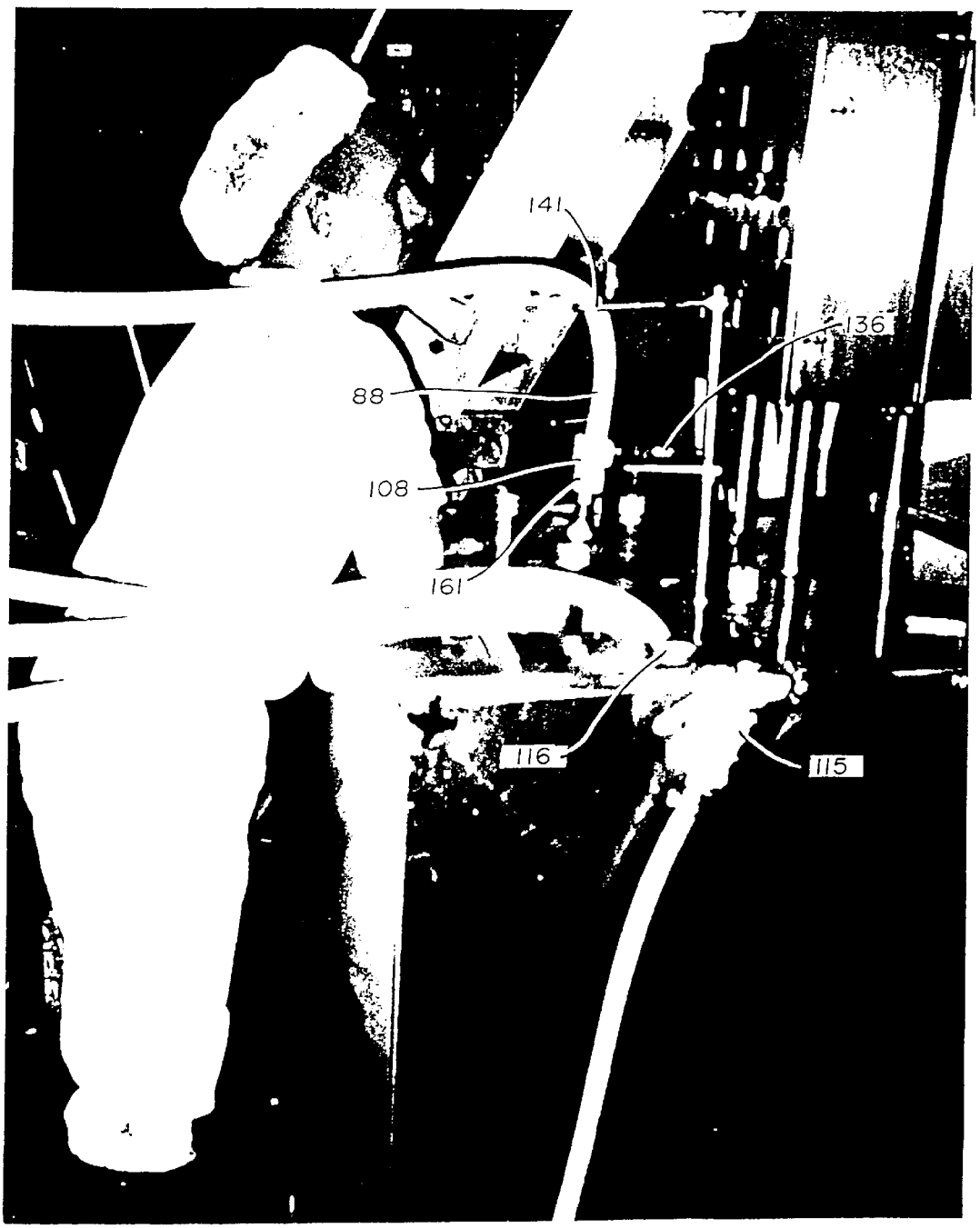
FIG. 11 shows a side perspective view of an operator at the sanitization station.

In the rinse start area 70 and adjacent to the rinsing station 84 is the sanitize station 104. The sanitizing station is shown best in FIG. 4, which is a top view of station 104, and will also be discussed in connection with FIGS. 5–8, which show top and side views of the RFID bracelet 108 (FIGS. 5–6) and top and side views of the nozzle assembly 92, RFID reader 136 and sanitizing bath 117 (FIGS. 7–8). FIG. 9 shows a top schematic view of the sanitize station 104. FIG. 10 shows a side view of the nozzle bath 117. FIG. 11 shows a side perspective view of an operator at sanitization station 104. The sanitizing of the hose, nozzle and operator's hands will discussed below with reference to FIGS. 4–11.

The sanitizing station 104 is used to sanitize the hose, nozzle, and the operator's hands before each use. Sensors and computer program interlocks between the rinse station 84 and the sanitize station 104 combine to require that certain activities are performed in a particular order before a rinse is allowed to start. Initially, the hose 88 and nozzle 92 are rinsed by water hose spray 115 and then dipped in the hose bath 116. In this embodiment, the water hose spray 115 may be directly connected to the sanitize station 104. In other embodiments, the water hose spray 115 may be remotely located. Water hose sprays are common to abattoir sites and are well know in the art. The hose bath 116 contains a solution of chlorinated water or similar cold sanitizing solution. Upon removal from this first solution the nozzle 92 is then inserted into one of the two nozzle sanitizing baths 117 or 118, which contains hot sterilizing (82° C. or hotter) water. The two baths 117 and 118 allow two hoses to be sterilized to speed processing. Since the construction and operation of both baths 117 and 118 are identical, only bath 117 will be discussed below.

The nozzle 92 is equipped with a locating collar 120 (best seen in FIG. 8) which has a predetermined diameter constructed in a manner to rest over the bath opening 124. The nozzle 92 is held in position by a bracelet support frame 140. The bracelet support frame 140 is sized such that the RFID bracelet 108 fits and is held securely. The bracelet support frame 140 also positions the RFID Bracelet 108 to be read by the third RFID reader 136. The hose 88 may be further constrained by a hose hook 141 (best seen in FIG. 10) positioned above the bracelet support frame 140. Locating collar 120 rests in ridge 126 above overflow vent 132. Sanitary coupling nut 161 couples hose 88 to nozzle 92.

The third RFID reader 136 is attached to a bracelet support frame 140 which engages the encapsulation bracelet RFID 108 when the nozzle 92 is properly inserted and secured into the nozzle sanitizing bath 117. The support bracket 140 is mounted to the sanitize station 104 by a mounting shaft 144 which collectively functions to keep the hose 88 and nozzle assembly 92 properly positioned so that the incorporated third RFID reader 136 can stay in continuous reading contact with the encapsulation bracelet RFID 108 for the time interval which is required to properly sanitize the nozzle 92.

This time interval for sanitation is determined by the exact temperature of the sanitizing bath. Thermal probe 129 is used by computer 54 to monitor the temperature of the nozzle sanitizing bath. For a temperature of 82° C., the sanitary catheter 112 portion of the nozzle 92 will need to be submerged no less that 10 seconds. The required time in the sanitizing bath is inversely proportional to the temperature of the sanitizing solution.

When the third RFID reader 136 detects the encapsulation bracelet RFID 108 a signal is sent to the computer 54. Only after the signal has been detected for the required continuous time period by the computer 54, will the computer 54 signal the user via lamp 147 that the nozzle is ready to be used for a rinse. The signaling is done electronically via a user interface 143 and user interface panel 145, schematically shown in FIG. 9, which contains a plurality of status and alarm lamps. Nozzle bath #1 status lamp is shown at 147 and its alarm at 149. Nozzle bath #2 status lamp is shown at 151 and its alarm at 153. Bath #2 allows the operator to be sanitizing a second hose and nozzle while using the first. The hose bath status lamp is shown at 155 and the hand bath status lamp is shown at 157. If the signal between the encapsulation bracelet RFID 108 and the third RFID reader 136 is interrupted prior to the completion of the predetermined immersion time, the computer 54 will require the user to restart the nozzle sanitation process before allowing that nozzle to be used for a rinse. If the nozzle 92 is removed from the sanitizing nozzle bath 117, thereby removing the RFID bracelet 108 from the reading field of the RFID reader 136, before the appropriate sanitizing time has expired, or if the temperature of the nozzle sanitizing bath drops below a specified limit, or if the nozzle will not be sanitized within a specified time limit, the computer 54 will activate the audible alarm 149 and the associated nozzle bath alarm lamp, both located on the user interface panel of the sanitize station 104.

Before the computer 54 allows a properly sanitized nozzle to be used for a rinse, the hands of the operator must also be sanitized by a similar procedure. First, the user must rinse off their hands and arms. Second, the user must dip one hand into each of the hand bath reservoirs 148 and 154 of cold sanitizing solution of at least 20 PPM chlorinated water, these reservoirs 148 and 154 being located at the sanitize station 104. Within each hand bath 148 and 154, is a float switch. Float switch 150 is in hand bath 148, while float switch 152 is in hand bath 154. These two float switches, 150 and 152, must be engaged simultaneously in order to proceed. To ensure that this step is followed the float switches 150 and 152, once engaged, signal the computer 54 that the step has been completed. When the float switches 150 and 152 are engaged properly, the computer 54 activates the hand bath status lamp 157 indicating to the operator that the nozzle pull timer has started. Once the nozzle pull timer is started, the operator has a limited amount of time to pull a properly sanitized nozzle for use. If the nozzle pull timer expires before the operator has pulled the nozzle, the hand bath status lamp 157 is deactivated. If the operator pulls a sanitized nozzle when the hand bath status lamp 157 is deactivated, the computer 54 will reset all of the sanitize flags and not allow that nozzle to be used for rinsing until the sanitize process is done properly.

After properly sanitizing both of their hands and arms, the operator is ready to locate the artery of the cow 14, in which to place the nozzle 92 for the rinse. Once located the operator pulls the nozzle 92 from the nozzle sanitizing bath 117, making sure the nozzle valve 160 (best seen in FIG. 4) is closed. This action causes the RFID bracelet 108 to leave the sensing field of RFID reader 136. The RFID reader signals the computer 54 that the nozzle 92 has been removed. The computer 54 checks the status of the nozzle and hand sanitation processes through bit flags set in its memory. If the nozzle 92 and operator hands have been properly sanitized, the computer 54 then checks RFID reader 82 for a valid shackle RFID 30. If a valid shackle RFID 30 is present, the computer 54 searches its database 55 to find the weight associated with that RHID 30. With this weight information, the computer 54 determines the proper amount of rinsing solution to use for that given cow 14. The computer 54 then actuates valves in the rinse station 84 allowing fluid to fill the hose 88 and nozzle 92. The computer 54 then turns off the hand bath status light 157 and the nozzle bath status light 147 (assuming bath #1 used) of the bath from which the nozzle 92 was drawn, and resets all of the sanitize sequence bit flags for the nozzle and hand bath. Resetting these bit flags prepares the sanitize station 104 for the next sanitizing sequence. The computer 54 then activates the hose status light 159 associated with the selected hose, and starts to monitor the flow through the hose by use of a flow meter in the rinse station 84.

Once the hose 88 and nozzle 92 are enabled with injectable rinsing and cooling solution, the operator must insert the nozzle 92 (in the preferred embodiment the aforementioned secured sanitary catheter 112 which is attached to the nozzle 92 is inserted) into the carotid artery of the cow 14 before a preset time has elapsed. If the preset time elapses before the computer 54 detects flow through the flow meters of rinse station 84, the audible alarm is activated and the associated hose lamp 159 is deactivated. Upon proper insertion, the operator manually opens a valve 160 to begin the flow of injectable solution into the circulatory system of the cow 14.

Once the rinse is properly started in the cow 14, the operator activates a switch opening transparent doors 100 allowing the rinsing animal to move along down the rail. In alternate embodiments, the cows 14 will be continuously conveyed along the rail through out the rinse start area 70 and into the remaining rinse area, and the doors 100 will be opened automatically.

As the cow 14 is being rinsed, the computer 54 monitors the flow of rinsing solution through the flow meters in rinsing station 84. The prescribed volume of the rinsing solution is allowed to flow through the circulatory system of the cow 14 and drain out the jugular veins of the cow 14. Once the prescribed volume of rinsing solution has been administered, the computer 54 closes the valve in the rinsing station 84 which was supplying rinsing solution to that hose 88. The computer 54 also deactivates the hose status light 159 associated with the given hose 88. The operator then washes their hands and removes the nozzle 92 from the cow 14. The operator begins the sanitizing process over again by using the spray hose 115 to clean their hands, arms, nozzle 92, and hose 88. The preferred embodiment uses four (4) hoses so that up to four (4) cows 14 may be rinsing at any given time. Each hose is then available and used again for every fourth cow 14.

Figure 12:
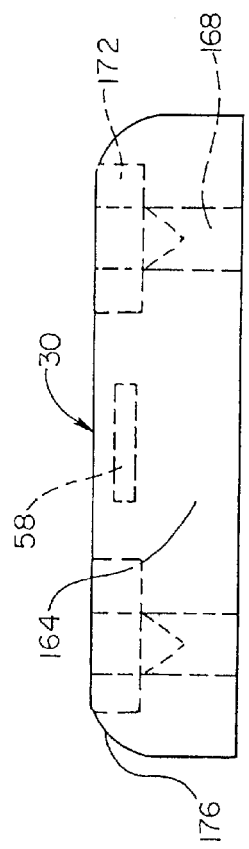
FIG. 12 is a frontal view schematic representation of the preferred embodiment RFID.
Figure 13:
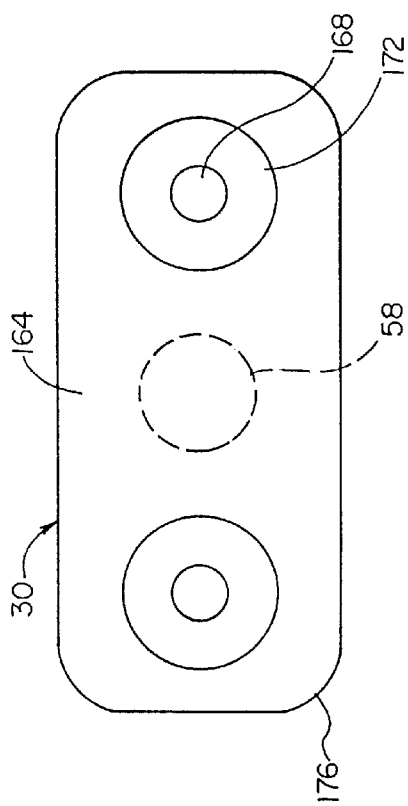
FIG. 13 is an overhead view schematic representation of the RFID.
Figure 14:
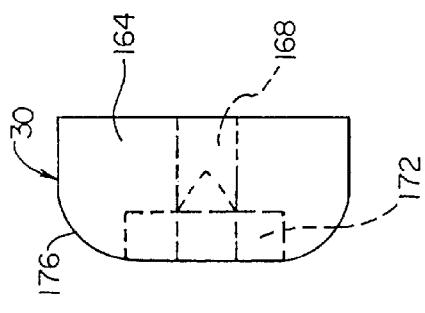
FIG. 14 is a side view schematic representation of the RFID.
Figure 15:
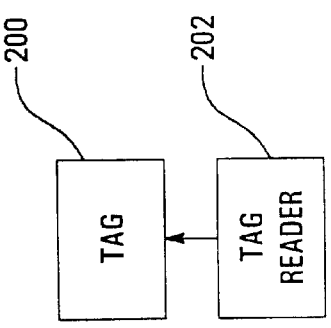
FIG. 15 is a block diagram of an improved tag and tag reader utilized in an alternative embodiment of the invention.

FIG. 12–14 details the various components that make up the RFID of the disclosed preferred embodiment. The manner of encompassing the electronic radio tag 58 ensures that the tag 58 is always kept insulated from ferrous material which is known to interfere with the operation of the tag 58 when in close proximity. The front of the tag is to have no metal at all between it and the RFID antenna. More space allows for more reading range. The shackle RFID enclosure is configured for at least ½" on back, ⅝" to a washer, and ½" to the support bolts. Exact read range is determined by tag size, RFID reader power and amount of and area covered by the ferrous material. Which materials interfere with magnetic and radio waves are well known to those in the field of RF identification and other fields. Steel is an example of such a material that limits RFID read range. Furthermore, such an enclosed tag 58 is protected from a wide variety of hostile environmental conditions such as high heat, high humidity, and high shock or impact. In the disclosed preferred embodiment the molded protective casing 164 is made from a curable liquid polyurea elastomer, sold under the trade name REN:C:O-THANE® by Ciba-Geigy Corporation, Formulated Systems Group.

The method of manufacture for the preferred embodiment involves pouring a predetermined amount of the curable liquid polyurea elastomer into a performed mold sufficient to fill the mold to a depth of at least ⅛ of an inch. This initial amount of polyurea elastomer is allowed to gel. Once the polyurea elastomer has gelled the electronic radio tag 58 is placed upon the gel in the desired position. After the tag 58 is placed the remaining amount of liquid curable polyurea elastomer is poured into the mold. In order to ensure a seamless fusion between the fist gelled layer of polyurea elastomer and the second, it is essential to the process to pour the second amount before the first layer is allowed to fully cure. In order to ensure proper insulation from ferrous material the distance separating the tag and the top of the mold must be at least ¼" of an inch, however ½" is preferred.

Subsequent to filly curing, the polyurea elastomer resin casing 164 is modified in a manner to allow the RFID to be mounted to a variety of surfaces. Drilled in a uniformly spaced manner are two insertion holes 168 which extend through the entire mold. These holes are drilled through at indentations in the resin made as a result of the mold design. The mold also includes contours that create holes of increased diameter spaces 172 suitable for placement of a bolt head, nut or other enlarged securing device on the same centers as the bolt insertion holes 168. It would be possible to avoid the added expense and effort of drilling the aforementioned components in an alternative embodiment by placing pre-existing members or appropriate dimensional character in the original mold form. In the preferred embodiment the bottom surface corners and sides 176 of the polyurea elastomer resin casing are rounded by the shape of the mold as is well known in the art. Further operations to the resin casting may include sanding and cutting to trim excess material and to smooth some surfaces. These sanding and cutting operations are well known in the art. The features of having a seamless fusion of the two portions of the casing, as well as having rounded corners and sides 176, help to make the RFID more resistant to physical impact, shock, and breakage.

Figure 5:
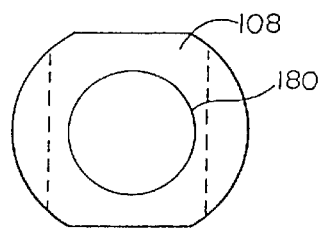
FIG. 5 is a frontal view schematic representation of the encapsulation bracelet and encased tag.
Figure 6:
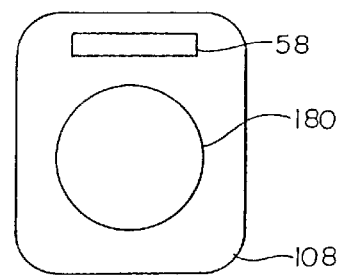
FIG. 6 is a top-down view schematic representation of the encapsulation bracelet and encased tag.
Figure 7:
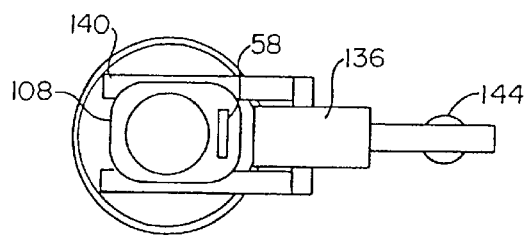
FIG. 7 is a top-down view of the hose, nozzle and associated encapsulation bracelet.
Figure 8:
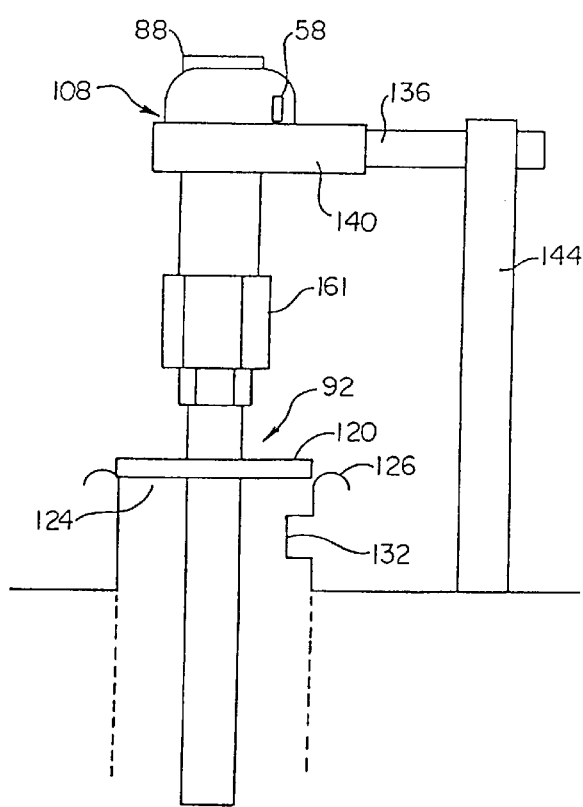
FIG. 8 is side view of the engaged bath and nozzle assembly with associated encapsulation bracelet.
Figure 9:
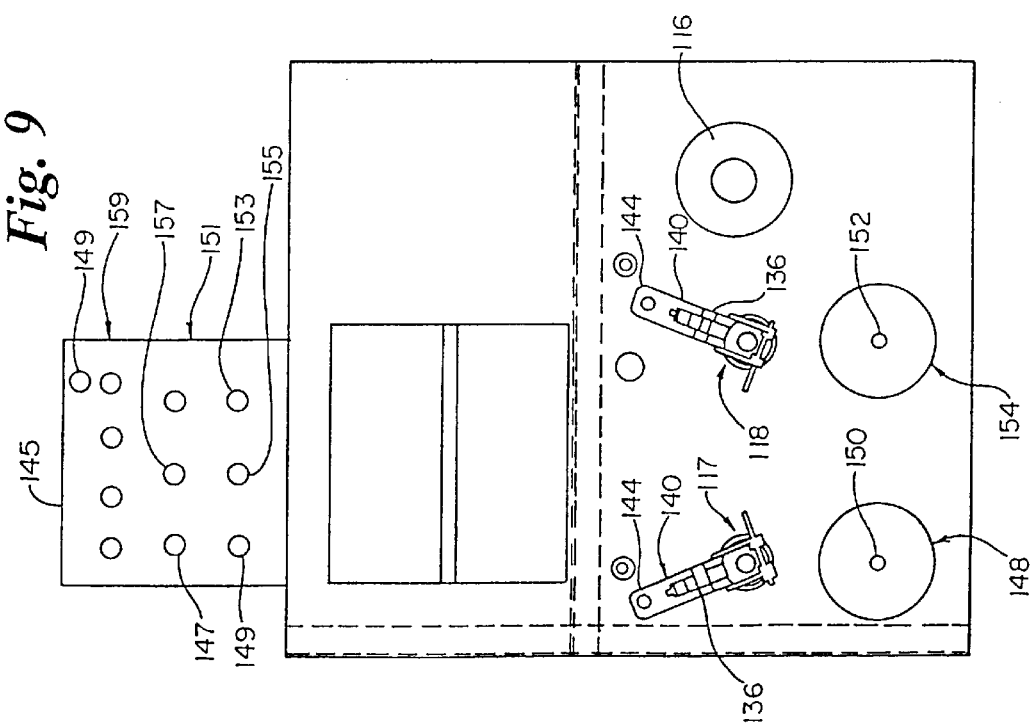
FIG. 9 shows a top schematic view of the sanitize station.

FIGS. 5–6 illustrate an alternative encapsulation bracelet embodiment of the RFID 108 device in which an annular opening 180 is drilled or provided for, which allows the encapsulation bracelet RFID 108 to be mounted directly onto the hose 88 as shown in FIG. 7–8. In an alternate embodiment, the encapsulation bracelet may be mounted on a mounting protrusion made part of the nozzle assembly 92. The nozzle assembly 92 is inserted into the nozzle sanitizing bath 117 in a manner that ensures the portion of the bracelet containing the electronic radio tag 58 is facing the third RFID reader 136 when the encapsulation bracelet RFID 108 is engaged with the support bracket 140. This positioning is accomplished by the operator through visual inspection of the encapsulation bracelet RFID 108 prior to inserting the nozzle 92 into the nozzle sanitizing bath 117.

Applicants have learned through further research that while the disclosed RFID tag is preferred, any type of machine readable tag could be utilized in the invention. This would include a tag 200 which is visually encoded, acoustically encoded, tactically encoded, olfactorilly encoded, or gustatorily encoded with a machine readable shackle number, and a corresponding tag reader 202 which can decode the encoded shackle number.

Visual based systems would include bar codes and bar code readers; direct vision based systems including cameras and OCR readers to decode the shackle number, and any other commercially available vision based system. In order to ensure vision based system worked properly, proper cleaning would be necessary to ensure that the tag could be visioned properly by the tag reader 202. Vision based systems as used herein is intended to encompass the entire electromagnetic spectrum and would therefore include the RFID tag technique; infrared wavelength communication; temperature differentially encode the information such as having the tag at a plurality of different temperatures, each corresponding to a different shackle number; inductively transfer the information, and the like.

Acoustically encoded systems could be based on commercially available digitally encoded information which is transmitted acoustically via ultrasonic sound pulses to the reader 202. Remotely controlled hearing aids are commercially available which utilize this technique for transmitting information. The tag 200 could simply store the circuitry necessary to record and playback the shackle number, which could be decoded by commercially available dictation programs, such as Dragon dictate. Any other commercially available acoustic system could be utilized as well.

Tactile system could be based on braille encoding, or digital fingerprint technology, as well as any other commercially available tactile system. Any commercially available olfactory or gustatory systems could be utilized as well.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the sanitary rinsing of an animal, comprising the steps of:
   a) providing an assembly line with a support along which a plurality of shackles may be moved, each shackle constructed and arranged for carrying an animal;
   b) providing a hose and nozzle assembly with an attached machine readable device (MRD), the hose and nozzle assembly being in fluid communication with a source of rinsing and cooling solution;
   c) automatically ensuring sanitization of the hose and nozzle assembly prior to insertion of the nozzle assembly into the circulatory system of the animal to be rinsed by arranging a hose MRD reader proximate to a hose and nozzle bath, which reads the hose MRD to ensure the hose and nozzle assembly is sanitized for a predetermined length of time, and
   d) enabling the flow of rinsing and cooling solution upon sanitization of the hose and nozzle assembly for the predetermined length of time.

2. The method of claim 1 wherein the machine readable information is encoded in the tag, the encoding being selected from the group consisting of: visually encoded, acoustically encoded, tactilly encoded, olfactorilly encoded, or gustatorily encoded.

3. The method of claim 2 wherein the MRD is visually read by the MRD reader.

4. The method of claim 2 wherein the MRD is acoustically read by the MRD reader.

5. The method of claim 2 wherein the MRD is tactilly read by the MRD reader.

6. The method of claim 2 wherein the MRD is olfactorilly read by the MRD reader.

7. The method of claim 2 wherein the MRD is gustatorily read by the MRD reader.

8. A method for the sanitary rinsing of an animal, comprising the steps of:
   a) providing an assembly line with a support along which a plurality of shackles may be moved, each shackle including a tag which includes a machine readable unique identification number;
   b) attaching an animal to one of the plurality of shackles;
   c) moving the shackled animal to a weighing station;
   d) reading the identification number with a tag reader;
   e) weighing the animal;
   f) transmitting the weight and associated identification number to a computer and recording them in a database stored in the computer;
   g) bleeding the animal;
   h) moving the shackled animal to a rinsing station;
   i) reading the tag associated with the animal at the rinsing station by a tag reader;
   j) looking up the weight of the animal in the database based on the identification number and calculating a predetermined amount of solution to inject into the animal based on the weight of the animal;
   k) automatically ensuring sanitization of the end portion of a hose and nozzle assembly which is connected to a rinsing unit which meters a supply of rinsing and cooling solution;
   l) automatically ensuring sanitization of the operator's hands;
   m) inserting a distal portion of the nozzle into the carotid artery of the animal;
   n) enabling the flow of the predetermined amount of rinsing and cooling solution to the distal portion of the nozzle upon the computer receiving the signals ensuring sanitization of the nozzle and operator's hands;
   o) initiating the flow of rinsing and cooling solution within a predetermined amount of time from the enabling of the flow;
   p) injecting the predetermined amount of rinsing and cooling solution into the animal.

9. The method of claim 8 wherein the machine readable information is encoded in the tag, the encoding being selected from the group consisting of: visually encoded, acoustically encoded, tactilly encoded, olfactorilly encoded, or gustatorily encoded.

10. A meat processing system of the type having an assembly line including a plurality of shackles, each for carrying an animal, and including a rinsing station where the animal is injected with a predetermined amount of rinsing and cooling solution, each rinsing station including a sanitizing station with a hose and nozzle bath for sanitizing the hose and nozzle assembly and hand baths for sanitization of the operators hands prior to injecting the rinsing and cooling solution into the circulatory system of the animal, the improvement comprising:
   a) a tag attached to the hose and nozzle assembly;
   b) a hose tag reader positioned proximate the hose and nozzle bath, the hose tag reader reading the hose tag when the hose and nozzle assembly are properly positioned in the hose and nozzle bath, and
   c) a computer operatively connected to the hose tag reader to ensure that the hose and nozzle assembly remain in the hose and nozzle bath for a predetermined amount of time to ensure proper sanitization of the hose and nozzle assembly.

11. The meat processing system of claim 10 wherein the tag is encoded with machine readable information, the encoding being selected from the group consisting of: visually encoded, acoustically encoded, tactilly encoded, olfactorilly encoded, or gustatorily encoded.

12. A meat processing system for rinsing and cooling an animal carcass comprising:
   a) an assembly line with a support along which a plurality of shackles may be moved, each shackle including a tag which includes a machine readable unique identification number;
   b) a weighing station for weighing an animal suspended from one of the plurality of shackles and transmitting the weight to a database;
   c) a first tag reader arranged for reading the unique identification number of the tag of the animal being weighed and for transmitting the identification number to the database;
   d) a bleeding station for bleeding the animal;
   e) a rinsing station for injecting a predetermined amount of rinsing and cooling solution into the circulatory system of the animal after sanitization of a nozzle fluidly connected to a supply of rinsing and cooling solution and after sanitization of the operator's hands;
   f) a second tag reader arranged for reading the unique identification number of the tag of the animal being rinsed, and for transmitting the identification number to the database;
   g) a computer operatively connected to the first and second tag readers and the database, which looks up the weight of the animal at the rinsing station based on the transmitted identification number and calculates the amount of rinsing and cooling solution to inject into the animal, the computer also being operatively connected to a third tag reader which is arranged relative to a sanitization station so as to read a tag connected to a hose which terminates in the nozzle, the hose and nozzle being sanitized by the sanitization station and the operator's hands being sanitized by the sanitization station, the computer enabling the flow of rinsing and cooling solution only after ensuring sanitization of the nozzle and operator's hands.

13. The meat processing system of claim 12 wherein the tag is encoded with machine readable information, the encoding being selected from the group consisting of: visually encoded, acoustically encoded, tactilly encoded, olfactorily encoded, or gustatorily encoded.

* * * * *

UNITED STATES PATENT AND TRADEMARK OFFICE
Certificate

Patent No. 6,196,912                                            Patented: March 6, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Casimir E. Lawler, Jr., Deephaven, MN.

Signed and Sealed this Fifteenth Day of January 2002.

*PETER M. POON*
*Supervisory Patent Examiner*
Art Unit 3643